V. ROYLE.
SAW SETTING APPARATUS.
APPLICATION FILED JAN. 2, 1915.
1,248,016.
Patented Nov. 27, 1917.
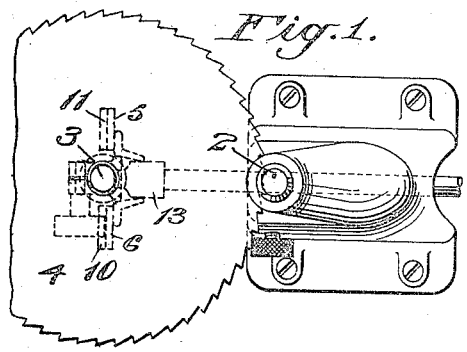
Fig. 1.
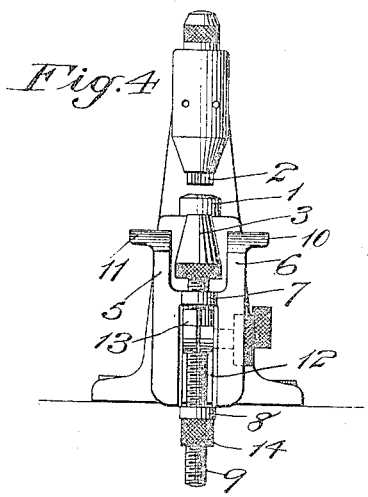
Fig. 4.
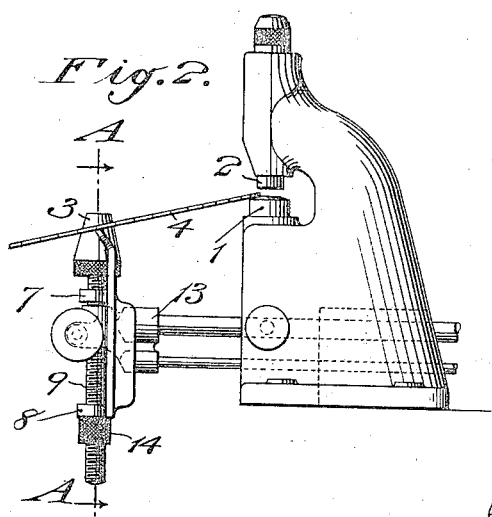
Fig. 2.
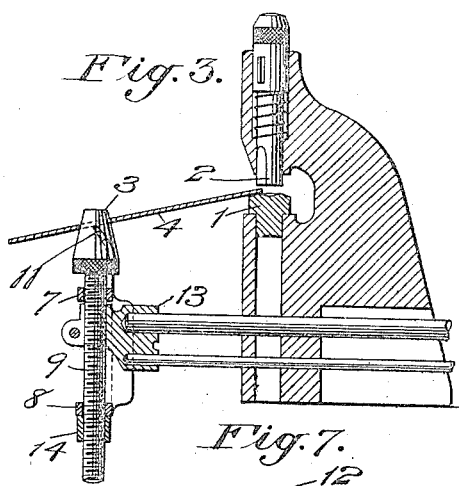
Fig. 3.
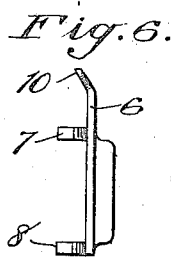
Fig. 6.
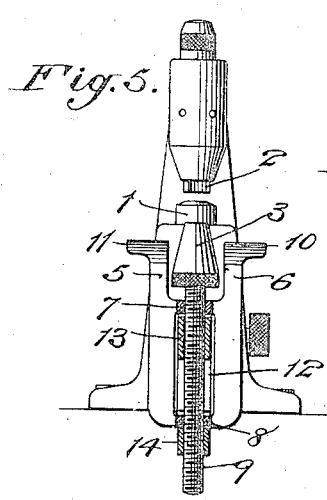
Fig. 5.
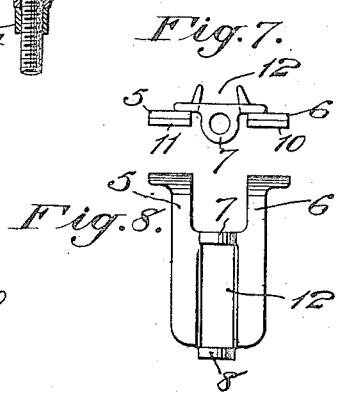
Fig. 7.
Fig. 8.
Witnesses:—
Hyperion Barry
F. George Barry
Inventor:—
Vernon Royle
by attorneys
Brown & Award

UNITED STATES PATENT OFFICE.

VERNON ROYLE, OF PATERSON, NEW JERSEY.

SAW-SETTING APPARATUS.

1,248,016.  Specification of Letters Patent.  Patented Nov. 27, 1917.

Application filed January 2, 1915. Serial No. 193.

*To all whom it may concern:*

Be it known that I, VERNON ROYLE, a citizen of the United States, and resident of Paterson, in the county of Passaic and State of New Jersey, have invented a new and useful Improvement in Saw-Setting Apparatus, of which the following is a specification.

My invention relates to saw-setting apparatus, and more particularly to a saw rest for maintaining a circular saw in a single plane during its rotary movement for bringing its teeth into position to be set.

In the accompanying drawings, Figure 1 is a top plan view of a saw-setting apparatus showing the rest in dotted outline and a portion of a circular saw in the position which it assumes when the teeth are being set.
Fig. 2 is a view of the same in side elevation, Fig. 3 is a vertical central section taken from front to rear.

Fig. 4 is a front elevation with saw removed,

Fig. 5 is a transverse section taken in the plane of the line A—A, Fig. 2, and

Figs. 6, 7 and 8 are respectively side elevation, plan and front elevation of the rest removed from the saw-setting apparatus.

The rest which forms the subject-matter of my present application and which intimately coacts with a centering device and an anvil or suitable support on which the teeth lie when acted upon by the setting tool, is here shown in connection with the saw-setting apparatus shown, described and claimed in my pending application Serial No. 863,494, filed September 25th, 1914.

The anvil is denoted by 1, the setting tool by 2, and the centering cone, movable toward and away from the anvil support, by 3. The saw is denoted by 4.
To insure an accurate setting of the teeth, it is important that the saw blade be prevented from tilting laterally on an axis extending along the blade from the longitudinal axis of the anvil through the axis of the centering cone. To effectively prevent such tilting, I provide a rest for the blade on opposite sides of the centering cone, as follows: A yoke piece comprising two upwardly extending arms 5 and 6 has two guide rings 7 and 8 formed thereon or secured thereto, which rings are intended to embrace with a sliding fit, the screw-threaded stem 9 of the centering cone 3. The rings 7 and 8 are here shown offset from the face of the yoke piece and the upper ends of the arms 5 and 6 are turned forward, as shown at 10, 11, to form points of rest for the saw blade at diametrically opposite sides of the axis of the centering cone 3. An elongated slot 12 in the yoke piece, allows the centering cone supporting bracket 13 to project through and receive the screw-threaded stem of the cone. The yoke piece is raised and allowed to lower by the screwing on or off of a nut 14 engaged with the threaded stem 9 below the guide ring 8.

In operation, the saw 4 having been placed on the cone 3 and adjusted at the proper distance from and inclination to the anvil by the horizontally sliding bracket 13 and the vertically adjustable cone 3, respectively, while the yoke piece or rest is lowered so as not to interfere, the yoke piece or rest is then raised until the upper ends of its arms 5 and 6 both touch the underside of the saw blade, when the work of setting may be done. The raising of the rest will adjust the blade if it is tilted out of the proper plane and will securely hold it against unintentional tilting during the setting operation.

What I claim is:

1. In saw setting apparatus, the combination with a centering device provided with a stem, of an anvil, a saw rest supported on the said stem of the centering device in position to engage the saw on opposite sides of a right line between the anvil and centering device.

2. In saw setting apparatus, the combination with an anvil and centering device, of a rest in position to engage the saw blade on opposite sides of and in line with the longitudinal axis of the centering device.

3. In saw setting apparatus, the combination with a centering device provided with a stem, of a saw rest supported on said stem and adjustable relatively to the centering device.

4. In saw setting apparatus, the combination with a centering device provided with a stem and means for adjusting it up and down, of a saw rest supported on the stem of the centering device and means for adjusting the rest up and down independently of the adjustment of the centering device.

5. Saw setting apparatus comprising an anvil having an inclined outer face portion and a depressed inner face portion and suitable means for centering and supporting a saw in an inclined operative relation to the anvil.

In testimony that I claim the foregoing as my invention, I have signed my name in presence of two witnesses, this fourth day of December, 1914.

VERNON ROYLE.

Witnesses:
 HEBER ROYLE,
 F. J. BRADLEY.

Copies of this patent may be obtained for five cents each, by addressing the "Commissioner of Patents, Washington, D. C."